US008571787B2

(12) United States Patent
Jendbro (10) Patent No.: US 8,571,787 B2
(45) Date of Patent: Oct. 29, 2013

(54) DYNAMIC ROUTING

(75) Inventor: Magnus Jendbro, Staffanstorp (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 976 days.

(21) Appl. No.: 11/567,306

(22) Filed: Dec. 6, 2006

(65) Prior Publication Data

US 2008/0140309 A1 Jun. 12, 2008

(51) Int. Cl.
*G01C 21/00* (2006.01)
(52) U.S. Cl.
USPC ........... 701/400; 701/408; 701/410; 701/411; 701/416; 701/426
(58) Field of Classification Search
USPC .......................................... 340/660; 345/660
See application file for complete search history.

(56) References Cited

U.S. PATENT DOCUMENTS

| | | | | | |
|---|---|---|---|---|---|
| 5,608,635 | A | * | 3/1997 | Tamai | 701/209 |
| 5,675,492 | A | * | 10/1997 | Tsuyuki | 701/210 |
| 6,006,161 | A | * | 12/1999 | Katou | 701/212 |
| 6,243,645 | B1 | * | 6/2001 | Moteki et al. | 701/211 |
| 6,392,661 | B1 | * | 5/2002 | Tankersley | 345/660 |
| 6,415,224 | B1 | * | 7/2002 | Wako et al. | 701/208 |
| 6,826,472 | B1 | * | 11/2004 | Kamei et al. | 701/202 |
| 6,839,628 | B1 | * | 1/2005 | Tu | 701/209 |
| 7,053,780 | B1 | * | 5/2006 | Straub et al. | 340/601 |
| 2002/0052674 | A1 | * | 5/2002 | Chang et al. | 700/300 |
| 2003/0151592 | A1 | * | 8/2003 | Ritter | 345/156 |
| 2004/0236507 | A1 | | 11/2004 | Maruyama et al. | |
| 2004/0254723 | A1 | | 12/2004 | Tu | |

FOREIGN PATENT DOCUMENTS

| EP | 1 836 167 | 4/1998 |
|---|---|---|
| EP | 1 698 860 | 9/2006 |

OTHER PUBLICATIONS

International Preliminary Report on Patentability for corresponding International Application No. PCT/IB2007/001537 dated Mar. 5, 2009.
Written Opinion for International Application No. PCT/IB2007/001537 dated Mar. 14, 2008.

\* cited by examiner

*Primary Examiner* — Bhavesh V Amin
(74) *Attorney, Agent, or Firm* — Renner, Otto, Boisselle & Sklar, LLP (57) ABSTRACT

An apparatus and method for providing navigation information via electronic equipment includes dynamically displaying a first route from a current location to a desired location; and dynamically displaying a second route to at least one point of interest. The first route is automatically displayed at a first zoom level, and the second route is automatically displayed at a second zoom level, wherein the first and second zoom levels are independent of one another. The apparatus and method can further use electronic equipment to identify at least one point of interest along a planned route, including comparing a user selected characteristic to at least one characteristic of a plurality of potential points of interest, said potential points of interest being within a predetermined range of the planned route; and identifying as a point of interest any of the plurality of potential points of interest that have at least one characteristic that satisfies the user selected characteristic.

22 Claims, 4 Drawing Sheets

DYNAMIC ROUTING

TECHNICAL FIELD OF THE INVENTION

The present invention relates generally to electronic equipment, such as electronic equipment for engaging in voice communications and/or for playing back audiovisual content to a user. More particularly, the invention relates to a device and method for providing meaningful navigation data to a user of a mobile radio terminal.

DESCRIPTION OF THE RELATED ART

Mobile and/or wireless items of electronic equipment are becoming increasingly popular. For example, mobile telephones are now in wide-spread use. In addition, the features associated with certain types of electronic equipment have become increasingly diverse. To name a few examples, many electronic equipment include cameras, text messaging capability, Internet browsing functionality, electronic mail capability, video playback capability, audio playback capability, image display capability, navigation capability, and hands-free headset interfaces.

Navigation capability provided on some mobile telephones enables a user to navigate from point "A" to point "B" based of information provided by the electronic equipment. For example, the user may enter a desired location, e.g., an address, a business name, an intersection, etc. Then, the electronic equipment may determine a current location, and a location of the desired location relative to the current location. The current location may be determined via conventional techniques, such as from a GPS receiver within the electronic equipment. Then, using maps stored within memory of the electronic equipment (or downloaded from a remote site), a course is plotted from the current location to the desired location.

As the user follows the plotted course, the electronic equipment may provide instructions to the user (e.g., turn left in fifty feet, etc.). Further, a display on the mobile telephone may be updated to reflect the user's current location, and points of interest may be shown on the map. The points of interest may include, for example, restaurants, hotels, gas stations, etc.

SUMMARY

A drawback to conventional navigation systems employed on electronic equipment, such as mobile telephones, is the manner in which points of interest are displayed. Often, a high level of detail (e.g., a high level of zoom or high zoom factor) is needed to make the planned route displayed on the mobile phone meaningful (e.g., to view railroad crossing, major intersections, etc.). At such high levels of zoom, however, it is not likely that points of interest will be seen on the display, since they generally are not on the planned route and, thus, outside the display area of the electronic equipment. As a result, one may miss or not be able to find the point of interest.

The present invention provides a method and apparatus for displaying navigation data on electronic equipment, such as a mobile phone, for example. The navigation data is presented in such a manner so as to enable the planned route to be viewed with sufficient detail so as to guide the user along the route, and also to provide visual and/or audio information with respect to points of interest so that the user can view the point of interest relative to the current location. Additionally, the method and apparatus can automatically identify points of interest that meet criteria specified by the user, such as, for example, gas stations that sell fuel at or below a predetermined price.

According to one aspect of the invention, a method for providing navigation information via electronic equipment includes dynamically displaying a first route from a current location to a desired location; and dynamically displaying a second route to at least one point of interest, wherein the first route is automatically displayed at a first zoom level, and the second route is automatically displayed at a second zoom level, said first and second zoom levels being independent of one another.

According to one aspect of the invention, displaying the second route includes displaying the second route from the current location to the at least one point of interest.

According to one aspect of the invention, displaying the first route includes computing the first route from the current location to the desired location, and wherein displaying the second route includes computing the second route from the current location to the at least one point of interest.

According to one aspect of the invention, computing the first and second routes includes using a server to compute the first and second routes.

According to one aspect of the invention, displaying the first and second route includes creating a first display area for displaying the first route, and creating a second display area for displaying the second route, said first display area being different from said second display area.

According to one aspect of the invention, displaying the first and second route includes alternately displaying the first route and the second route.

According to one aspect of the invention, displaying the second route includes displaying the second route in a different color than the first route.

According to one aspect of the invention, the method further includes entering or selecting a characteristic of the at least one POI; and using said characteristic to identify the at least one point of interest.

According to one aspect of the invention, entering or selecting the characteristic includes using criteria that describes a property of goods and/or services offered at the at least one point of interest.

According to one aspect of the invention, the characteristic is entered as a logical expression.

According to one aspect of the invention, entering or selecting the characteristic includes using at least one of a name of the at least one point of interest, one or more goods and/or services offered at the at least one point of interest, or a price of the one or more goods and/or services offered at the at least one point of interest.

According to one aspect of the invention, the at least one point of interest is a plurality of points of interest, and wherein displaying the second route includes displaying a route to a primary point of interest of the plurality of points of interest, and when a relationship between the current location and a location of the primary point of interest does not satisfy a predetermined criteria, displaying a route to at least one alternate point of interest of the plurality of points of interest.

According to one aspect of the invention, the predetermined criteria is at least one of the current location being within a predetermined distance of the primary point of interest, or a current bearing being within a predetermined direction of the primary point of interest.

According to one aspect of the invention, displaying the first and/or second route includes displaying at least one of textual and/or graphical data that corresponds to the at least one point of interest.

According to one aspect of the invention, displaying graphical data includes using at least one of different colors or graphical shapes to represent the at least one point of interest.

According to one aspect of the invention, an electronic equipment includes a display screen; a dynamic routing circuit operative to dynamically provide a first route from a current location to a desired location at a first zoom level, and to dynamically provide a second route from the current location to at least one point of interest at a second zoom level, wherein the first and second zoom settings are independent of one another; and a display circuit operatively coupled to the display and the dynamic routing circuit, said display circuit operative to receive and to display the first and second route on the display screen.

According to one aspect of the invention, the dynamic routing circuit is operative to compute the first route from the current location to the desired location, and compute the second route from the current location to the at least one point of interest.

According to one aspect of the invention, the display circuit is operative to display the first route in a first display area, and to display the second route in a second display area, said first display area being different from said second display area.

According to one aspect of the invention, the dynamic routing circuit alternately provides the first and second route to the display circuit.

According to one aspect of the invention, the dynamic routing circuit is operative to identify the at least one point of interest based on a user specified characteristic.

According to one aspect of the invention, the electronic equipment is a mobile telephone.

According to one aspect of the invention, a method for using electronic equipment to identify at least one point of interest along a planned route includes comparing a user selected characteristic to at least one characteristic of a plurality of potential points of interest, said potential points of interest being within a predetermined range of the planned route; and identifying as a point of interest any of the plurality of potential points of interest that have at least one characteristic that satisfies the user selected characteristic.

According to one aspect of the invention, the method further comprises obtaining the planned route from a navigation application that is at least partially executed on the electronic equipment.

According to one aspect of the invention, comparing the user selected characteristic includes using characteristics that describes a property of at least one good and/or service offered at the at least one point of interest.

According to one aspect of the invention, the predetermined range is user selectable.

According to one aspect of the invention, the characteristic is a logical expression.

According to one aspect of the invention, a program embodied on a computer readable medium for providing navigation information via electronic equipment includes code that dynamically displays a first route from a current location to a desired location; and code that dynamically displays a second route to at least one point of interest, wherein the first route is automatically displayed at a first zoom level, and the second route is automatically displayed at a second zoom level, said first and second zoom levels being independent of one another.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

The term "electronic equipment" includes portable radio communication equipment. The term "portable radio communication equipment," which herein after is referred to as a "mobile radio terminal," "mobile phone," "mobile device," or "mobile terminal", and the like, includes all equipment such as mobile telephones, pagers, communicators, i.e., electronic organizers, personal digital assistants (PDAs), smartphones, portable communication apparatus or the like.

In the present application, the invention is described primarily in the context of a mobile phone. However, it will be appreciated that the invention is not intended to be limited to a mobile phone and can be any type of electronic equipment.

The present invention will now be described with reference to the drawings, wherein like reference numerals are used to refer to like elements throughout.

Figure 1:
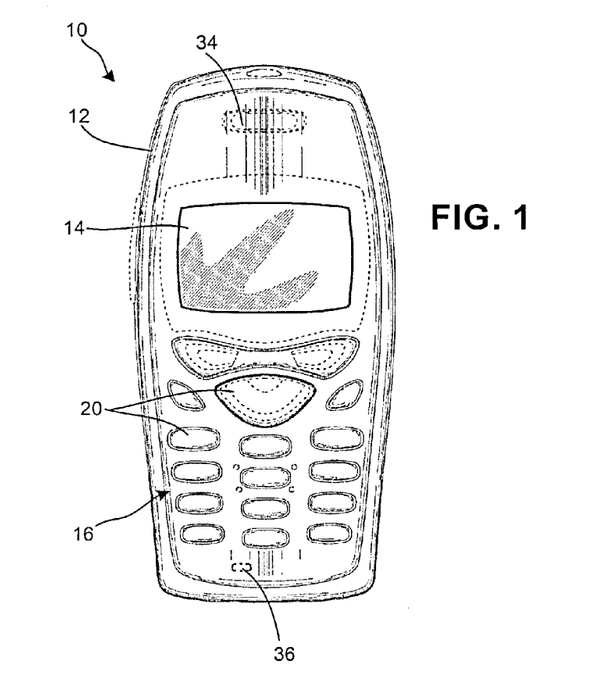
FIG. 1 is a schematic view of a mobile telephone as an exemplary electronic equipment in accordance with an embodiment of the present invention.

Referring initially to FIG. 1, an electronic equipment 10 is shown in accordance with the present invention. The electronic equipment includes a dynamic routing function that is configured to provide navigation information (e.g., a planned route, current location, directions, etc.) that enables a user to navigate from point "A" to point "B", as well as to provide information regarding points of interest (POI) that may be outside the planned route, current location, etc. It will be appreciated that the dynamic routing function may be embodied as executable code that may be resident in and executed by the electronic equipment 10.

The electronic equipment in the exemplary embodiment is a mobile telephone and will be referred to as the mobile telephone 10. The mobile telephone 10 is shown as having a "brick" or "block" form factor housing 12, but it will be appreciated that other type housings, such as a clamshell housing or a slide-type housing, may be utilized without departing from the scope of the invention.

The mobile telephone 10 includes a display 14 and keypad 16. As is conventional, the display 14 displays information to a user such as operating state, time, telephone numbers, contact information, various navigational menus, etc., which enable the user to utilize the various features of the mobile telephone 10. The display 14 may also be used to visually display content received by the mobile telephone 10 and/or retrieved from a memory 18 (FIG. 2) of the mobile telephone 10.

Similarly, the keypad 16 may be conventional in that it provides for a variety of user input operations. For example, the keypad 16 typically includes alphanumeric keys 20 for allowing entry of alphanumeric information such as telephone numbers, phone lists, contact information, notes, etc. In addition, the keypad 16 typically includes special function keys such as a "call send" key for initiating or answering a call, and a "call end" key for ending or "hanging up" a call. Special function keys may also include menu navigation keys, for example, for navigating through a menu displayed on the display 14 to select different telephone functions, profiles, settings, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 includes conventional call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc.

Figure 2:
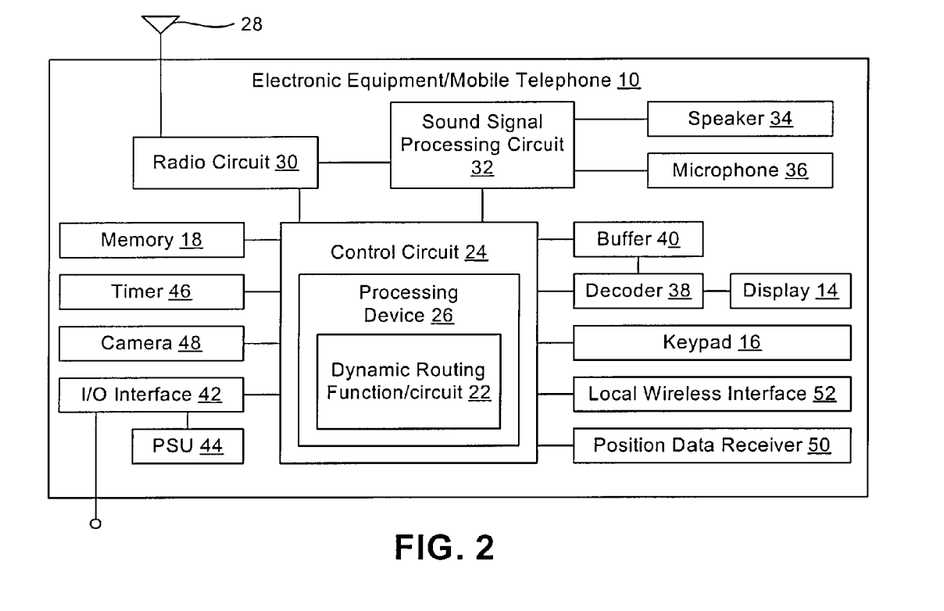
FIG. 2 is a schematic block diagram of the relevant portions of the mobile telephone of FIG. 1 in accordance with an embodiment of the present invention.

FIG. 2 represents a functional block diagram of the mobile telephone 10. With the exception of a dynamic routing function 22, which is preferably implemented as executable logic in the form of application software or code within the mobile telephone 10, the construction of the mobile telephone 10 is otherwise generally conventional. The mobile telephone 10 includes a primary control circuit 24 that is configured to carry out overall control of the functions and operations of the mobile telephone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out conventional operation of the mobile telephone 10. The memory 18 may be, for example, one or more of a buffer, a flash memory, a hard drive, a removable media, a volatile memory, a non-volatile memory or other suitable device. In addition, the processing device 26 executes code in order to perform the dynamic routing function 22.

It will be apparent to a person having ordinary skill in the art of computer programming, and specifically in applications programming for mobile telephones or other items of electronic equipment, how to program a mobile telephone 10 to operate and carry out the functions described herein. Accordingly, details as to the specific programming code have been left out for sake of brevity. Also, while the dynamic routing function 22 is executed by the processing device 26 in accordance with the preferred embodiment of the invention, such functionality could also be carried out via dedicated hardware, firmware, software, or combinations thereof, without departing from the scope of the invention. Any of these implementations may be referred to a dynamic routing circuit.

Continuing to refer to FIGS. 1 and 2, the mobile telephone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications system, as well as to receive audiovisual content. For example, the receiver may be an IP datacast compatible receiver compatible with a hybrid network structure providing mobile communications and DVB-H based or similar services. Other receivers for interaction with a mobile radio network or broadcasting network are possible and include, for example, GSM, CDMA, WCDMA, MBMS, WiFi, WiMax, DVB-H, ISDB-T, etc.

The mobile telephone 10 further includes a sound signal processing circuit 32 for processing audio signals transmitted by/received from the radio circuit 30. Coupled to the sound processing circuit 32 are a speaker 34 and a microphone 36 that enable a user to listen and speak via the mobile telephone 10 as is conventional. The radio circuit 30 and sound processing circuit 32 are each coupled to the control circuit 24 so as to carry out overall operation.

The mobile telephone 10 also includes the aforementioned display 14 and keypad 16 coupled to the control circuit 24. The display 14 may be coupled to the control circuit 24 by a video decoder 38 that converts video data to a video signal used to drive the display 14. The video data may be generated by the control circuit 24, retrieved from a video file that is stored in the memory 18 or derived from an incoming video data stream received by the radio circuit 30. Prior to being fed to the decoder 38, the video data may be buffered in a buffer 40.

The mobile telephone 10 further includes one or more I/O interface(s) 42. The I/O interface(s) 42 may be in the form of typical mobile telephone I/O interfaces and may include one or more electrical connectors. As is typical, the I/O interface(s) 42 may be used to couple the mobile telephone 10 to a battery charger to charge a battery of a power supply unit (PSU) 44 within the mobile telephone 10. In addition, or in the alternative, the I/O interface(s) 42 may serve to connect the mobile telephone 10 to a wired personal hands-free adaptor (not shown). Further, the I/O interface(s) 42 may serve to connect the mobile telephone 10 to a personal computer or other device via a data cable. The mobile telephone 10 may receive operating power via the I/O interface(s) 42 when connected to a vehicle power adapter or an electricity outlet power adapter.

The mobile telephone 10 may also include a timer 46 for carrying out timing functions. Such functions may include timing the durations of calls, generating the content of time and date stamps, etc. The mobile telephone 10 may include a camera 48 for taking digital pictures and/or movies. Image and/or video files corresponding to the pictures and/or movies may be stored in the memory 18. The mobile telephone 10 also may include a position data receiver 50, such as a global positioning system (GPS) receiver, Galileo satellite system receiver or the like. The mobile telephone 10 also may include a local wireless interface 52, such as an infrared transceiver and/or an RF adaptor (e.g., a Bluetooth adapter), for establishing communication with an accessory, hands-free adaptor, another mobile radio terminal, computer or other device.

The mobile telephone 10 may be configured to transmit, receive and process data, such as text messages (e.g., a short message service (SMS) formatted message), electronic mail messages, multimedia messages (e.g., a multimedia messaging service (MMS) formatted message), image files, video files, audio files, ring tones, streaming audio, streaming video and so forth. Processing such data may include storing the data in the memory 18, executing applications to allow user interaction with data, displaying video and/or image content associated with the data, broadcasting audio sounds associated with the data and so forth.

Figures 3, 4:
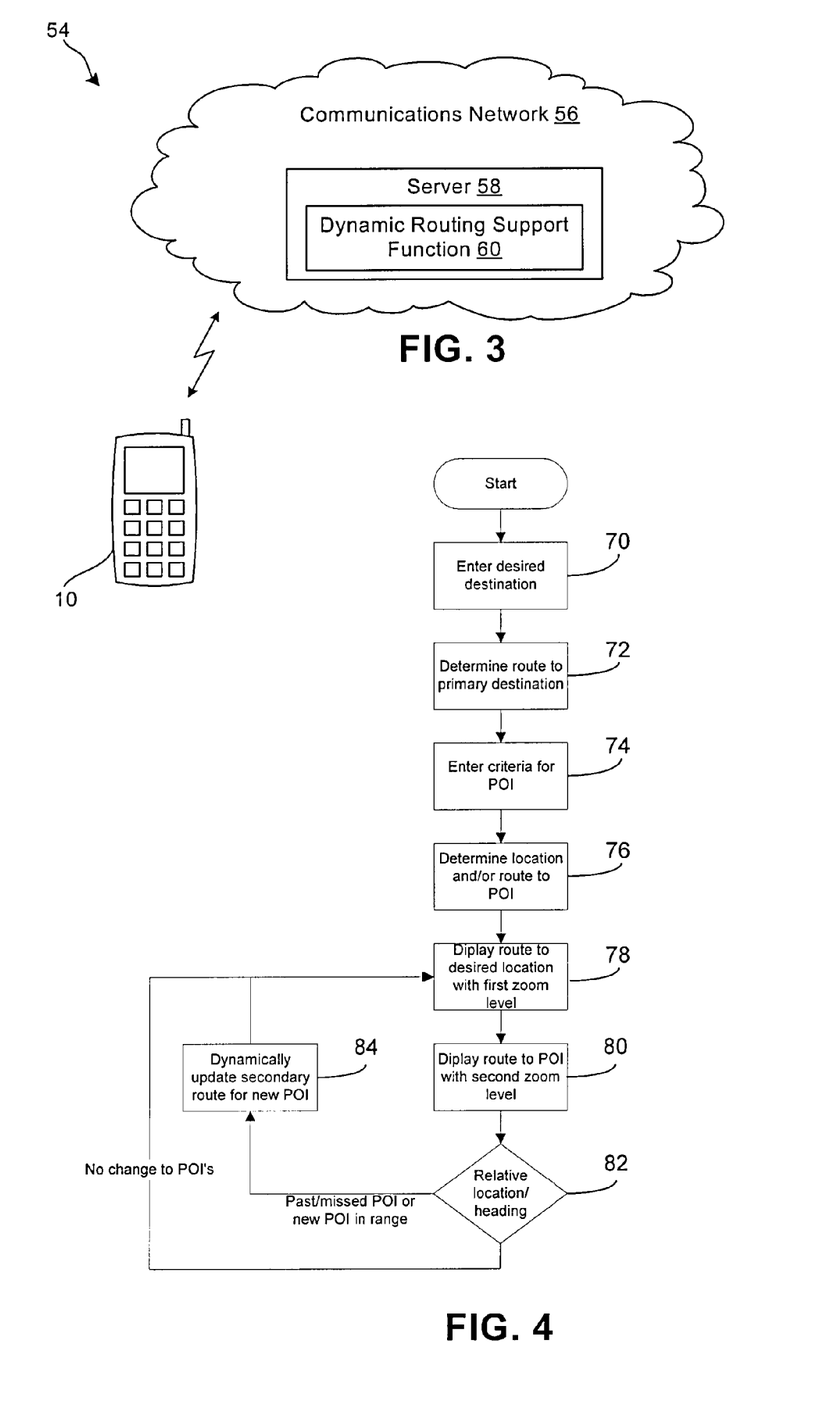
FIG. 3 is a schematic diagram of an exemplary communications system in which the mobile telephone of FIG. 1 may operate.
FIG. 4 is a flow chart of an exemplary dynamic routing function in accordance with the present invention.

With additional reference to FIG. 3, the mobile telephone 10 may be configured to operate as part of a communications system 54. The system 54 may include a communications network 56 having a server 58 (or servers) for managing calls placed by and destined to the mobile telephone 10, transmitting data to the mobile telephone 10 and carrying out any other support functions. The server communicates with the mobile telephone 10 via a transmission medium. The transmission medium may be any appropriate device or assembly, including, for example, a communications tower, another mobile telephone, a wireless access point, a satellite, etc. Portions of the network may include wireless transmission pathways. The network 56 may support the communications activity of multiple mobile telephones 10, although only one mobile telephone 10 is shown in the illustration of FIG. 3.

In one embodiment, the server 58 may operate in stand alone configuration relative to other servers of the network 52 or may be configured to carry out multiple communications network 58 functions. As will be appreciated, the server 58 may be configured as a typical computer system used to carry out server functions and may include a processor configured to execute software containing logical instructions that embody the functions of the server 58. Those functions may include functions that are complimentary to the operation of the dynamic routing function 22 of the mobile telephone 10, and will be collectively referred to as a dynamic routing support function 60.

Referring now to FIG. 4, a method of providing dynamic routing for a user of the mobile telephone 10 is depicted. The exemplary method of FIG. 4 describes the creation of a planned route, map, instructions, etc. to a desired destination as well as points of interest along the map, planned route, etc. Further while the dynamic routing function 22 is described as residing primarily on the mobile telephone 10, portions may reside in other locations. For example, portions of the dynamic routing function 22 may reside on the server 58 (e.g., within the dynamic routing support function 60), or on another PC (not shown), and once the planned route, directions, etc., has/have been created, the server 58 and/or PC may transfer the planned route, directions, etc. to the mobile telephone 10. The functionality of the method may be embodied as executable code, such as in the form of the dynamic routing function 22 and/or the dynamic routing support function 60, or any other suitable form, including software, firmware, dedicated circuit components, a program stored on a computer readable media or in machine usable medium, and so forth.

Although the illustrated method shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

The method may begin in block 70, wherein a desired destination is entered into the mobile telephone 10. For example, a user of the mobile telephone 10 may be traveling to an unfamiliar city. The user can enter a name of the city, an address, a zip code, etc. into the mobile telephone 10 via keys 16 and 20, or by speaking the location into the microphone 36 of the mobile telephone 10. If the location is entered via the microphone, voice recognition techniques can be used to determine the desired destination. Once entered into the mobile telephone, the desired destination can be stored in memory 18.

Next, at block 72, the mobile telephone 10 computes or otherwise obtains a route from the mobile phone's current location to the desired location. The current location, for example, can be determined from data obtained by the position data receiver 50 (e.g. a GPS receiver) within the mobile telephone 10. Using conventional navigation techniques, a route from the current location to the desired location can be computed. For example, the mobile telephone 10 may have a navigation application stored in memory 18, wherein the navigation application includes or has access to electronic maps of a particular area or region (e.g., a road map for the U.S., Europe, etc.). Based on the current and desired location, as well as other information, the navigation application can compute a route that directs the user to the desired location, as is conventional. Alternatively, the mobile telephone 10, via network 56, may forward the current and desired location to the server 58. The server 58, which can include navigational applications, can plan the route from the current location to the desired location. Once the route has been planned, the server 56 can transfer the route (including maps) to the mobile telephone 10 via the network 56.

At block 74, one or more points of interest (POI) are entered into the mobile phone 10. A POI may be any location, address, landmark, etc. that is of relevance to the user. For example, the planned trip may span several hours, during which time the user expects to stop for food and/or do some shopping. The user may have a preference for a particular restaurant, or a particular style of food. To identify these restaurants and/or restaurants that offer a particular style of food as a POI, the user, via the keys 16 and 20 and/or microphone 36, may enter into the mobile telephone 10 the particular restaurant name (e.g., McDonald's, Burger King, etc.) or a general description of the POI (e.g., restaurant, retail store, etc.) followed by a qualifier (e.g., a particular type or style of food, such as a burger shop, sub shop, Mexican style, Italian style, German style, etc.), or a particular type of store (e.g., electronics, music, clothing, etc.). Regardless of what is entered as a POI, the information can be stored in memory 18 of the mobile phone 10 and used to identify POI's as described below with respect to block 76. To minimize the number of entries made by the user, defaults can be set for the different POI's. For example, a default can be set to search for gas stations selling at 5 cents below the regional average price and within 5 miles of the planned route.

In addition to entering characteristics (e.g., name, location, business type, etc.) of the POI, the user may specify additional criteria for the POI. For example, the user may wish to identify as a POI any gas station along or within a specified range of the planned route that sells gas at or below a particular price. To identify such gas stations as a POI, the user can enter a general term (e.g., gas) followed by one or more logical operators and/or logical expressions (e.g., <$2.25 AND 5 mile radius). Based on this exemplary entry, any gas station within a 5 mile radius of the planned route that sells gas at or below $2.25 per gallon will be identified as a POI. This information then can be stored in memory 18 for processing at block 76.

At block 76, the mobile telephone 10 processes the POI information stored in memory 18. For example, if the POI is identified as a restaurant or restaurant name, the mobile telephone 10 may access the server 58 and request that the server 58 search for all restaurants that match the entered criteria and are located along or near (e.g., within a predetermined or specified range) the planned route. The server 58 may access a database stored in memory to retrieve such information (e.g., a database identifying various restaurant information within an area or region). Alternatively, the server 58 may perform an internet search using the restaurant name, the planned route and/or current location as criteria for the search (e.g., search within a 5 mile radius of the current location for restaurants that match the entered name). The search results, via network 56, then may be provided back to the mobile telephone 10.

A similar process may take place with respect to identifying gas stations as POI's. For example, the server 58 may include or have access to a database that includes gasoline prices throughout a predefined area (e.g., in a state, region, or country). Such database may be periodically updated (e.g., once per day) so as to reflect the current selling price of gas at each gas station. When the user identifies gas stations as a POI followed by additional pricing criteria, the server 58 then can access the database and search for all gas stations that are within the specified range along the planned route that satisfy the criteria. Once identified, the server 58 can provide the information to the mobile telephone 10 via network 56. Although the above example utilizes the server 58 to implement a portion of the dynamic routing function, it should be appreciated that such functionality can be partially or completely implemented with the mobile telephone 10, with or without any interaction from the server 58.

At blocks 78 and 80, the planned route and the POI's are displayed on the display 14 of the mobile telephone 10. Since the planned route is used to navigate to the desired location, it is desirable that the planned route be displayed with sufficient detail so as to provide meaningful feedback to the user with respect to a current location. Such detail typically includes street names, intersections, landmarks, etc. Since electronic equipment, such as a mobile telephone, for example, generally has a small form factor, the available display area may be somewhat limited. As a result, it is advantageous to apply a high level of zoom to the planned route so as to provide sufficient detail (e.g., street names, landmarks, etc.) to the user. However, since POI's generally are not precisely on the planned route (they typically are some distance away from the planned route), the high level of zoom places the POI's off of the display 14 and, thus they cannot be seen relative to a current location of the mobile telephone 10.

Figure 5:
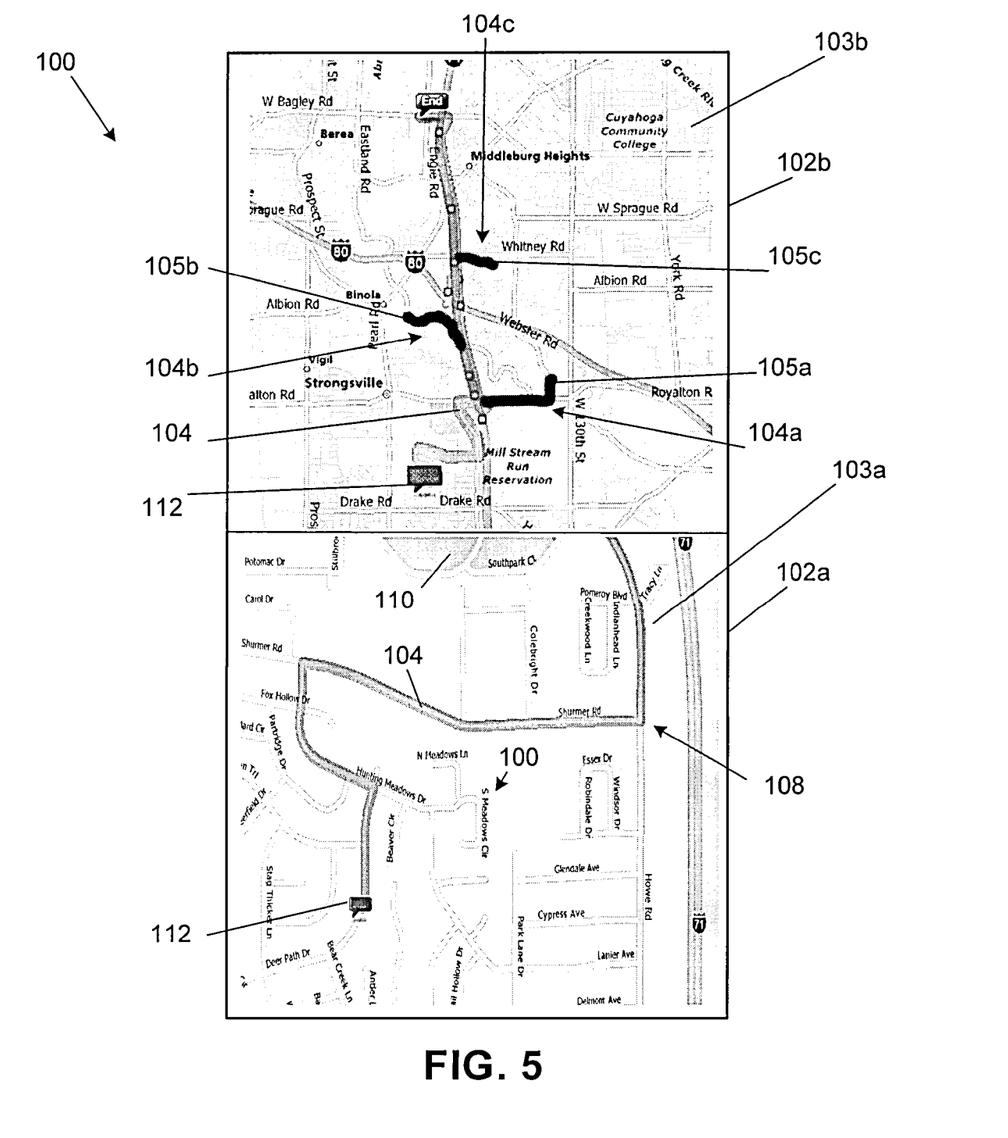
FIG. 5 illustrates an exemplary manner in which navigation data and points of interest may be presented on the mobile telephone.

To enable the POI's to be shown on the display 14 along with planned route, a display area of the display 14 may be divided into separate regions. With further reference to FIG. 5, a display area 100 is shown that includes first and second regions 102a and 102b. The first region 102a can display a high detail view 103a of the planned route 104, wherein street names 106, intersections 108, landmarks 110, etc. are easily viewable on the high detail display 103a. Further, a current location 112 of the mobile telephone 10 (and thus of the user) can be shown in the high detail view 103a of the first display region 102a. Such detail provides meaningful feedback to the user as he navigates to the desired location.

The second display region 102b can display a low detail view 103b of the planned route 104, wherein a larger map area is displayed at a lower level of detail or low zoom setting (e.g., a zoom sufficient to display the planned route and points of interest along or near the route). Thus, the second display area 102b displays the planned route 104, along with alternate routes 104a, 104b and 104c to various POI's 105a, 105b and 105c.

Although not shown in the low detail view 103b, information can be provided in the low detail view 103b that describes or otherwise identifies each POI. This information can include textual information (e.g., a name or description of the POI), or graphical information (e.g., graphics in the shape of a landmark, store, restaurant, etc. that correspond to the POI), or a combination thereof. Like the high detail display 103a of the first display area 102a, a current location 112 also can be shown in the low detail display 103b of the second display area 102b.

From the combination of the high and low detail views 103a and 103b, the user is provided with meaningful data pertaining to navigation and to POI's. Moreover, all of this information is available on a small display device.

Figure 6A:
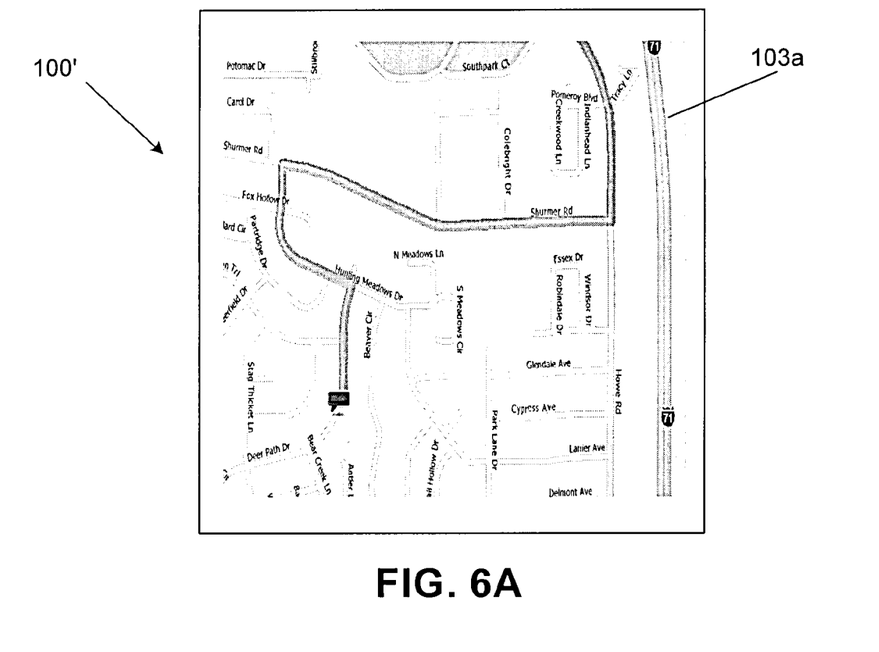
FIGS. 6A and 6B illustrate another exemplary manner in which navigation data and points of interest may be presented on the mobile telephone.
Figure 6B:
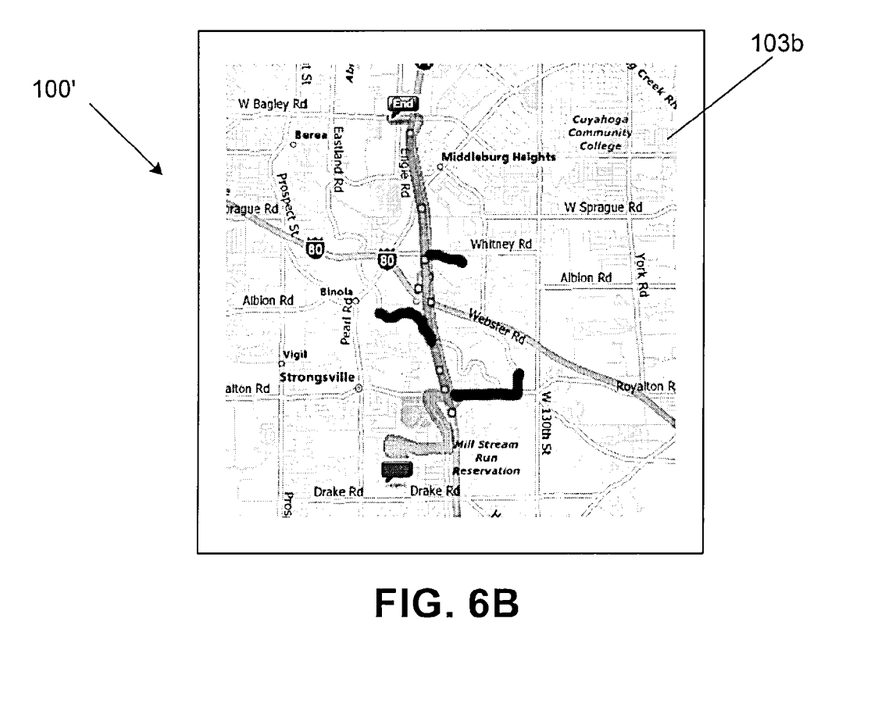

FIGS. 6A and 6B illustrate an alternate means for displaying the high detail view 103a and the low detail view 103b on the display 14 of the mobile telephone. In the exemplary embodiment of FIGS. 6A and 6B, the display area 100' of the display 14 is not split into multiple regions. Instead, the entire display area 100' is available for display of the high and low detail views 103a and 103b. Both the high and low detail views 103a and 103b are displayed in the display area 100', wherein an alternating scheme is used. For example, the high detail view 103a may be shown in the display area 100' for a predetermined amount of time (e.g., 5 seconds, which may be user settable) and then the low detail view 103b may be shown in the display area 100' for a predetermined amount of time. This alternating pattern can be repeated so as to always provide the user with a detailed view of the current location as well as a view of POI's relative to the current location.

In addition to the above, the planned route 104 to the desired destination and the routes 104a, 104b and 104c to the POI's may be shown in different colors. For example, on the low detail view 103b, the planned route 104 may be shown in red, while routes 104a, 104b, and 104c may be shown in blue. Further, the color of the POI routes 104a, 104b and 104c may correspond to a characteristic of the POI (e.g., blue for formal restaurants, green for fast food restaurants, yellow for retail stores, etc. As will be appreciated, if the POIs are viewable on the high detail view 103a (e.g., they are very close to the planned route 104), then the above color scheme also may be employed on the high detail view 103a.

Moving back to FIG. 4, at block 82 the relative heading and/or location of the mobile telephone 10 is compared to a location of the POI's. If the current heading and/or location is toward, in the general direction, and/or otherwise within range of the POI (e.g., the POI is still on or within range of the planned route), then the method moves back to block 78. If, however, the current heading and/or location is/are in a direction away from the POI, then at block 84 the high and/or low detail views 103a and 103b are dynamically updated to display the next available POI's (assuming the POI's are within range of the current location).

For example, if a POI, such as a restaurant, for example, is identified on the low detail view 103b, and the user misses or simply passes the exit for this POI, then the low detail view will be dynamically updated to remove the missed POI. Further, if a new POI is comes within range of the low detail view 103b (e.g., due to relative motion, the area displayed by the low detail view 103b now includes the new POI), then the new POI is displayed on the low detail view 103b.

Further, if it is detected that the user is heading toward the POI (e.g., he is stopping to get a bite to eat), the navigation application can automatically direct the user to the POI. For example, the navigation application can detect when the mobile telephone 10 (and thus the user) deviates from the planned route and/or is heading to a POI 105a, 105b or 105c. The navigation application then can guide the user to the POI via voice assistance. Additionally, the high detail view 103a can temporarily display the POI route 104a, 104b or 104c (as opposed to the planned route 104) to further assist the user in finding the POI.

Accordingly, a device and method for providing navigation and POI data on electronic equipment has been provided. More specifically, navigation data (e.g., data relating to a current location) can be provided at a first level of detail or zoom, while secondary data (e.g., data pertaining to one or more points of interest) can be provided on the display at a second level of detail or zoom. As a result, the user can easily navigate to the desired location while viewing relative location of points of interest, without adjusting a level of zoom of the displayed area.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for providing navigation information via electronic equipment, comprising:
   dynamically displaying a first planned route from a current location to a desired location; and
   dynamically displaying a second planned route to at least one point of interest, wherein the first planned route is automatically displayed at a first zoom level, and the second planned route is automatically displayed at a second zoom level, said first and second zoom levels being independent of one another.

2. The method of claim 1, wherein displaying the second planned route includes displaying the second planned route from the current location to the at least one point of interest.

3. The method of claim 1, wherein displaying the first planned route includes computing the first planned route from the current location to the desired location, and wherein displaying the second planned route includes computing the second planned route from the current location to the at least one point of interest.

4. The method of claim 3, wherein computing the first and second planned routes includes using a server to compute the first and second planned routes.

5. The method of claim 1, wherein displaying the first and second planned route includes creating a first display area for displaying the first planned route, and creating a second display area for displaying the second planned route, said first display area being different from said second display area.

6. The method of claim 1, wherein displaying the first and second planned route includes alternately displaying the first planned route and the second planned route.

7. The method of claim 1, wherein displaying the second planned route includes displaying the second planned route in a different color than the first planned route.

8. The method of claim 1, further comprising:
entering or selecting a characteristic of the at least one POI; and
using said characteristic to identify the at least one point of interest.

9. The method of claim 8, wherein entering or selecting the characteristic includes using criteria that describes a property of goods and/or services offered at the at least one point of interest.

10. The method of claim 1, further comprising:
entering, as a logical expression, a characteristic of the at least one POI; and
using said characteristic to identify the at least one point of interest.

11. The method of claim 8, wherein entering or selecting the characteristic includes using at least one of a name of the at least one point of interest, a good and/or service offered at the at least one point of interest, or a price of the good and/or service offered at the at least one point of interest.

12. The method of claim 1, wherein the at least one point of interest is a plurality of points of interest, and wherein displaying the second planned route includes displaying a planned route to a primary point of interest of the plurality of points of interest, and when a relationship between the current location and a location of the primary point of interest does not satisfy a predetermined criteria, displaying a planned route to at least one alternate point of interest of the plurality of points of interest.

13. The method of claim 12, wherein the predetermined criteria is at least one of the current location being within a predetermined distance of the primary point of interest, or a current bearing being within a predetermined direction of the primary point of interest.

14. The method of claim 1, wherein displaying the first and/or second planned route includes displaying at least one of textual and/or graphical data that corresponds to the at least one point of interest.

15. The method of claim 14, wherein displaying graphical data includes using at least one of different colors or graphical shapes to represent the at least one point of interest.

16. An electronic equipment, comprising:
a display screen;
a dynamic routing circuit operative to dynamically provide a first planned route from a current location to a desired location at a first zoom level, and to dynamically provide a second planned route from the current location to at least one point of interest at a second zoom level, wherein the first and second zoom settings are independent of one another; and
a display circuit operatively coupled to the display and the dynamic routing circuit, said display circuit operative to receive and to display the first and second planned route on the display screen.

17. The electronic equipment of claim 16, wherein the dynamic routing circuit is operative to compute the first planned route from the current location to the desired location, and compute the second planned route from the current location to the at least one point of interest.

18. The electronic equipment of claim 16, wherein the display circuit is operative to display the first planned route in a first display area, and to display the second planned route in a second display area, said first display area being different from said second display area.

19. The electronic equipment of claim 16, wherein the dynamic routing circuit alternately provides the first and second planned route to the display circuit.

20. The electronic equipment of claim 16, wherein the dynamic routing circuit is operative to identify the at least one point of interest based on a user specified characteristic.

21. The electronic equipment of claim 16, wherein the electronic equipment is a mobile telephone.

22. A computer program embodied on a computer readable storage medium for providing navigation information via electronic equipment, comprising:
code that dynamically displays a first planned route from a current location to a desired location; and
code that dynamically displays a second planned route to at least one point of interest, wherein the first planned route is automatically displayed at a first zoom level, and the second planned route is automatically displayed at a second zoom level, said first and second zoom levels being independent of one another.

* * * * *